Aug. 5, 1958
A. H. SCHUTTE
2,846,373
CONTINUOUS CONTACT CRACKING
Filed Dec. 21, 1951
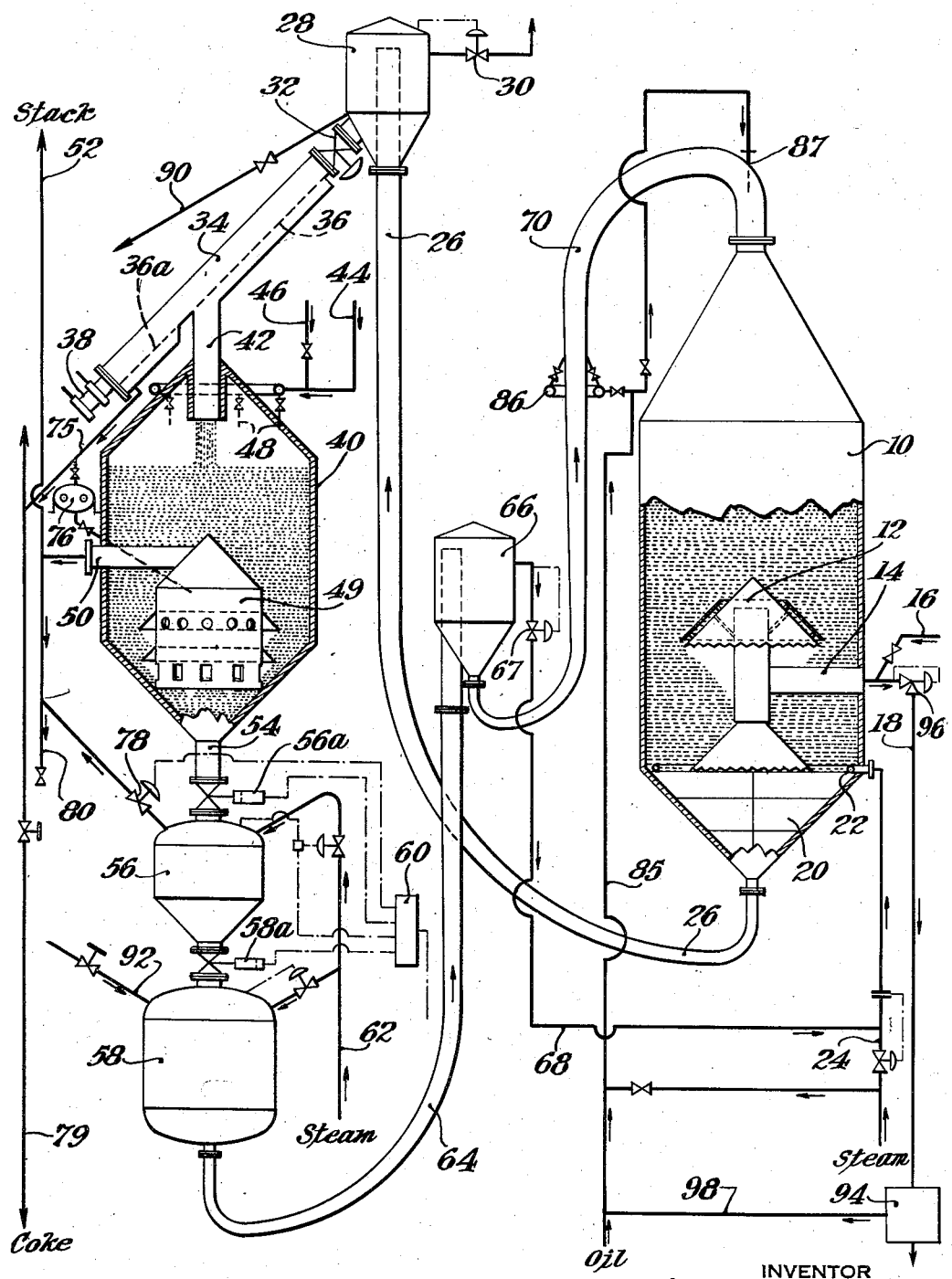
INVENTOR
August Henry Schutte
BY
Nathaniel Ely
ATTORNEY

2,846,373
CONTINUOUS CONTACT CRACKING

August H. Schutte, Hastings-on-Hudson, N. Y., assignor to The Lummus Company, New York, N. Y., a corporation of Delaware Application December 21, 1951, Serial No. 262,719

2 Claims. (Cl. 196—55)

This invention relates to a continuous non-residuum cracking of heavy liquid hydrocarbons to provide high yields of gasoline. It is a modification of the invention disclosed in my co-pending application Serial No. 252,306, filed October 20, 1951, now abandoned.

I have heretofore disclosed a continuous process for the conversion of liquid hydrocarbons wherein the hydrocarbon, in liquid phase, is uniformly distributed over a continuously moving gravity-packed column of preheated coke particles which serve to supply the required heat for the reaction. The vaporous material is withdrawn for further cracking or other treating and the residue liquid on the particles moves downward with the column and ultimately forms a dry integrated part of the particles so that only vapor and dry solids are removed from the reaction system. These dry inert particles may then be reheated and returned to the reaction. By control of the coke temperature, system pressure and coke to oil ratio, I have effectively processed heavy stocks to produce coke and a synthetic crude which contains a substantial yield of nearly virgin gas oil which is then available for cracking in conventional thermal or catalytic units.

My present invention is based on a modification of the foregoing method by which I obtain an unusually high conversion per pass to produce maximum yields of gasoline from stocks that under normal circumstances are entirely unsuited either for catalytic conversion because of the high yield of carbon or are unsuited for thermal cracking due to premature coking or very low conversion per pass.

My invention is more particularly based on the discovery, that in a continuous contact system of the above type the primary product vapors are largely formed almost immediately in the oil contact zone. At the same time, the unflashed liquid tends to coat or wet the particles and as long as the bed particles in the reactor are so wetted, the effective surface temperature of these particles, which corresponds to the boiling point of the liquid, is approximately 150° to 200° F. below the coke inlet temperature. This low surface temperature of the wetted coke particles, being so far below the cracking temperature, in effect, affords a quenching of the vapors and the contact of the vapors with the wetted particles during their passage through the wetted bed does not produce a significant amount of cracking. As the particles pass slowly down through the reactor, the liquid film gradually dries out from heat supplied by the sensible heat from within the particles and when dry, the surface temperature of the particles rises rapidly to heat balance equilibrium temperature. The vapors are largely removed, however, before the particles become completely dry and revert to their actual high temperature. The effective bed temperature in the zone of vapor traverse is thus too low to produce extensive vapor phase conversion.

In view of the above discovery, I find that I can readily control the conversion per pass by adjusting both the temperature of the coke inlet, and the oil partial pressure. Contrary to usual practice I find it necessary to limit the pre-heat temperature of charge in my process because an increase generally causes a reduction in the conversion per pass. This is due to the fact that the higher oil feed pre-heat temperatures result in partial vaporization of most feed stocks and in the absence of vapor phase cracking, it will be apparent that the conversion of the charge material to lighter products is decreased. I also use a higher pressure than usual on the reactor to restrain vaporization and give a greater conversion per pass. This is more pronounced in dealing with this combined vaporization-cracking operation because the effect of pressure is to increase the extent of cracking which must go on before the liquid can be converted to the vapor. I have found that relatively small changes in pressure are much more effective than in the case of conventional thermal cracking where the major effect of pressure increase is longer vapor soaking time.

I have therefore produced for the first time a system for converting hydrocarbons into predominant yields of gasoline, utilizing stocks which are normally incapable of treatment by thermal or catalytic processes.

Such charging stocks include all hydrocarbon materials which, due to their boiling range, carbon residue or other characteristics, deposit too much carbon on a cracking catalyst to permit economic operation. Thermal cracking of such charging stocks at high severity results in rapid coking of the fired heaters and such short run lengths between shutdowns for cleaning of the furnace tubes as to be impractical. Such materials are now either blended into black fuel oils or are cracked thermally at low severity conditions, mainly for viscosity reduction. If such stocks are coked by conventional means they are processed so as to obtain a minimum yield of low quality gasoline and a gas oil fraction which is reprocessed for gasoline yield in other equipment.

As described in Patent 2,561,334 of which I am a coinventor, such stocks may be processed by contact coking for maximum cracking stock yields. The difference between this type of operation and that herein described is shown by the following example. Given a reduced crude containing 30 volume percent boiling below 900° F. and desiring a gas oil for subsequent cracking having a 900° F. end point, the continuous coking operation would be run so as to obtain the minimum thermal conversion consistent with the product gas oil end point. Thus, the 900° F. virgin gas oil would be vaporized and taken directly as product. The resulting re-reduced crude would be cracked in the coking operation just sufficiently to obtain 900° F. end point on the gas oil product. Typical operating conditions might be 5 to 10 p. s. i. a. oil partial pressure in the reactor, 1040° F. coke inlet temperature and 970° F. coke outlet temperature from the reactor. A minimum amount of material boiling below 900° F. would be recycled to the reactor. If other operating conditions were maintained constant in the above case and only the inlet coke temperature were increased, the degree of cracking and the gasoline yield would not necessarily increase because primary vaporization at the feed point would be greater and more of the charge would appear unconverted in the products.

In order to take advantage of the wetted-bed or film cracking mechanism to produce maximum yields of high octane gasoline and disregard the quality of the gas oil product as a catalytic charging stock the operating conditions given above must be modified. Since the degree of cracking is a function of the amount of liquid charged to the coke circulating stream and the partial pressure of oil in the reactor, the pre-vaporization of the feed must be repressed, the oil partial pressure increased, the coke inlet temperature increased and more light gas oil recycled. For example, operations would be at 10 to 50 p. s. i. a. oil partial pressure, 1100° F. coke inlet, 1000° F. coke outlet and the product fractionation so controlled as to recycle light gas oil for further conversion. This type of operation is essentially a cracking process, as contrasted with the former conditions cited for coking.

Further objects and advantages of my invention will appear from the following description of a preferred form of embodiment thereof, taken in connection with the attached drawing in which the figure is a schematic elevation with parts in section of the major elements of a cracking system in accordance with my invention.

A preferred form of apparatus to carry out my invention generally includes the sealed reaction zone 10 which may conveniently be a tall generally cylindrical vessel. The coke particles which are made in the system as hereinafter described, are introduced to this reaction zone through the inlet conduit 70 in a preheated condition in the order of 1000° F. to 1200° F. The liquid charge from line 85 is uniformly distributed to these coke particles at 86 and/or 87 as may be found most effective. The charge is also preheated but to a temperature substantially below incipient coking and under sufficient pressure to minimize vaporization.

In the reaction zone 10, the initial contact of the charge on the very hot particles causes a very rapid conversion of the charge material into vapors, most of which are released at this time. This conversion also causes a cooling of the particles which remain coated with the liquid residue so that the reaction zone is substantially dense packed with wetted coke particles moving downwardly continuously and substantially uniformly by gravity. In the lower part of the reaction zone is the vapor disengager 12 the details of which are specifically described and claimed in my co-pending application serial No. 214,947, now U. S. Patent No. 2,701,788. The vapors are then removed through the outlet 14 in which they may be further quenched by liquid introduced at 16. The vapors then pass by line 18 to a vapor condenser and liquid separator 94 for further recovery and treatment. Valve 96 provides the desired control.

As heretofore mentioned, the coke particles although normally at 1000° to 1200° F. at the inlet, are found to have a surface temperature of 150° F. to 200° F. below the inlet temperature and entirely throughout the reaction zone. This is due to the fact that as long as the particles are wetted, they will have a surface temperature corresponding to the boiling point of the liquid film. And it is not until the particles reach the stripping zone that they are sufficiently dry to attain a surface temperature approaching their internal temperature. This is borne out by the coke outlet temperature measurements which are higher than those recorded in the main part of the reaction zone.

It will thus be apparent that as the coke particles have a surface temperature which is only that of the boiling point of the liquid, thermal cracking of the initial vapors is entirely absent or negligible. By the time the particles become dry and of substantial cracking effect, they have already been removed from contact with the vapors.

The dry solids pass through a bottom drawoff device generally indicated at 20 and more specifically described in my co-pending application, Serial No. 214,948, now U. S. Patent No. 2,658,031, such drawoff preferably including a series of vertical splitter plates so that there is a uniform flow of the particles throughout the reaction zone 10. A steam purging ring 22 supplied by steam line 24 serves not only to purge all of the vapors from the discharging solids, but, in combination with the stripping bed, provides an upward flow of superheated steam which prevents coking in the vapor outlet 14.

The dry coke particles discharge through the line 26 which extends to the elevated disengager 28. A relatively low pressure is maintained on this disengager by the control valve 30 so that the transfer of particles may be mechanically accomplished by the superior pressure in the reactor 10 which may be in the order of 15 to 100 p. s. i. g. The line 26 is preferably tapered and by throttling the discharge of particles from the open end of line 26 by limiting the rate of drawoff from disengager 28 by the setting of valve 32, the particles move in the line 26 in mass flow condition.

The flow of particles from the disengager 28 is preferably by gravity through the classifier 34 which may be provided with internal screen bars 36 to separate out the largest particles which are removed through the outlet valve 38. The major portion of the particles comprising smaller sized particles are discharged into the reheater 40 through the line 42.

The reheater 40, which is operated at approximately atmospheric pressure, is supplied with air and a fuel gas through the lines 44 and 46, respectively, which discharge to burners 48 mounted in the upper wall, such burners heating the particles by radiation and convection. Flue gases are removed through collector 49 and line 50 to the stack 52. The hot coke particles discharge in a uniform manner through the outlet 54.

To obtain a suitable mass flow transfer of the particles from the outlet 54 of the reheater 40 at nearly atmospheric pressure to the higher pressure reaction zone 10, I prefer to use tandem vessels 56 and 58 which are provided with valves 56a and 58a, such valves in turn being cyclically controlled by controller 60. The controller 60 also controls a pressure steam line 62 and a vent valve 78 to alternately pressure and depressure chamber 56. With the lift chamber 58 at 100 p. s. i. g. and the coke reheater 40 at 2 p. s. i. g., the coke flow in the lift lines 64 feeding the reaction zone is continuous. The lock chamber 56 serves to deliver the solids from the low pressure reheater 40 to the high pressure lift chamber 58 without causing pressure fluctuations in the rest of the system. The coke level in the reheater 40 and in the lift chamber 58 fluctuates slightly with the intermittent delivery of solids to and from the lock chamber 56. The lift lines, however, operate at all times in a fully dense packed manner or "mass" flow due to the fact that the reaction zone 10 always contains the maximum amount of solids.

The complete control of flow is accomplished by the valve 32 which can be set at any desired rate within the limits of the flow of the apparatus. The flow from the bottom of lift chamber 58 and from the bottom of the intermediate disengager 66 will be at the same rate as the rate of withdrawal from the bottom of the reactor 10 into the line 26 and into the top disengager 28. Preferably the steam line 62 may be fed from refinery steam line of at least 120 to 150 p. s. i. g. pressure which is normally enough for the continuous elevation of the particles to the required height. A sixty foot sealing and lifting line 26 requires a minimum pressure of about 36 p. s. i. g. to operate and if required, it will effectively resist high differential pressures such as 200 p. s. i. g., without excessive gas flow.

The intermediate disengager 66 is particularly beneficial because of the greater requirements for lifting gas or steam at the bottom of line 64 than at the intermediate section of the line. The excess gas under suitable control at 67 may be reintroduced to the purge ring 22 by means of line 68. This disengager is located at a vertical position such that the steam so disengaged is at sufficient pressure for reuse in the bottom of the reactor 10 in steam inlet 22. The high superheat of this steam leaving disengager 66 from contact with the hot solids is also advantageously utilized. The amount of steam reused and saved by this arrangement will amount to ⅓ to ⅔ of the total steam flowing through lift line 64 depending on the relative pressures and the structural design of the system.

With proper structural arrangement, the pressure in reactor 10 is more than sufficient to overcome the pressure drop required for operation of the reactor outlet lift line 26. Since the oil vapors are withdrawn at an intermediate level and there is an upward flow of stripping steam from steam inlet 22, oil vapors are prevented from leaving the reactor through line 26 with the solids. Part of the total steam introduced into the reactor bottom will therefore flow with the solids through line 26 and will provide the lifting medium requirements of this line. Since the reactor 10 is at elevated pressure, maintained by controlling the pressure in the oil vapor drawoff line 14, and since the reactor always contains the maximum inventory of solids, it is not necessary to provide displacement steam equivalent to the volume of the flowing solid particles. Also, the steam requirement for displacing the void volume between the solid particles has been provided in order to do the stripping in the lower section of the reactor below the vapor drawoff 14. The net steam required for operating the lift line 26 is therefore very small, amounting to only the steam required to produce the required pressure drop in the line.

The apparatus also includes certain subordinate features including a drawoff at 75 of a small part of the largest particles through the secondary screen 36a, such materials being passed in part through the crusher 76 and thence returned to the reheater 40. The net amount of coke may be drawn off through line 79 which is in communication with the drawoff line 75.

The manner of applying the liquid charge is as more particularly described in my co-pending application 214,947, now U. S. Patent No. 2,701,788, which more specifically includes the provision of an oil charge line 85 through which oil may be introduced to the moving particles passing through line 70, as indicated by a series of inlets at 86. Alternatively the charge may be introduced at 87 to the particles just before entering the reactor 10. Recycle may be charged through 98.

Since the oil is usually charged to the mixing zone at about 650 to 850° F. and the circulating coke may be at a temperature of 1000° to 1200° F., upon initial contact vaporization and rapid cracking occurs. It has been found that if the resulting foam of unvaporized oil and vapors is forced to take a pressure drop of at least 20" of water in passing through the restricted column of coke downstream of the feed point, uniform contact and uniform wetting of the coke particles are assured, since the vapor-liquid mixture is forced to travel through all the bed void passages in this section of the mixing zone. Passage of oil vapors backward through coke feed line is prevented, of course, by the forward flow of steam under the differential pressure between the intermediate disengager 66 and the reactor 10. Since the feed leg 70 and the mixing zone 10 are completely filled with coke, no surface is present which is not continually scrubbed by flowing coke particles. It is also important to adjust the heat losses from the walls of the oil-coke mixing zone and the top cone of the reactor so as to obtain wall temperatures significantly lower than those prevailing on the lower walls of the reactor vessel. This effectively eliminates coke formation on anything but the coke particles and this is an important feature of this invention and a departure from the prior art.

Typical examples of operations in accordance with my invention are as follows:

| Run No. | 43–A | 20A–B | 58–B | 61–A |
|---|---|---|---|---|
| Feed Stock, ° API Gravity | 10.6 | 10.6 | 3.9 | 3.9 |
| Oil Charge Rate, B./D | 82 | 55 | 77 | 61 |
| Oil Charge Temperature, ° F | 779 | 775 | 779 | 775 |
| Coke Circulation Rate, Tons/hr | 9 | 8.2 | 7.7 | 8.7 |
| Coke to Reactor, ° F | 1,033 | 1,013 | 1,126 | 1,069 |
| Coke From Reactor, ° F | 961 | 966 | 1,003 | 1,003 |
| Top Reactor Temperature, ° F | 890 |  | 930 | 880 |
| Bottom Reactor Temperature, ° F | 893 | 898 | 942 | 904 |
| Oil Partial Pressure, #/sq. in., abs | 6.2 | 4.5 | 4.9 | 2.9 |
| *Products* | | | | |
| Wt. percent $C_3$ and Lighter | 7.9 | 7.3 | 13.7 | 8.3 |
| Wt. percent $C_4$'s | 2.3 | 1.8 | 3.1 | 1.5 |
| Wt. Percent $C_5$–400 E. P. Gasoline | 12.5 | 12.2 | 14.2 | 9.3 |
| Wt. Percent Gas Oil+Recycle | 67.3 | 69.4 | 49.1 | 63.5 |
| Wt. Percent Coke | 10.0 | 9.3 | 19.9 | 17.4 |
| End Point of Liquid Product, ° F | 1,020 | 1,070 | 1,120 | 1,280 |

Comparing runs 43–A and 20A–B on the same feed stock, it will be noted that the 43–A run was carried out at an oil charge rate equivalent to 150% of that used for the 20A–B run. The oil charge temperature to the reactor was essentially the same and the coke inlet temperature to the reactor was varied in order to obtain as nearly as posisble the same bed temperature and coke outlet temperature. Since the void volume in the coke bed was the same for both runs, the vapor soaking time in the bed voids was 50% greater in the case of the 43–A run. In spite of this fact, the conversion of the oil charge and the product distribution for the two runs was essentially identical when operated at practically the same bed temperature and final coke outlet temperatures. If anything, the conversion was slightly higher in the case of the higher oil rate run.

The effect of oil partial pressure is shown by runs 58–B and 61–A on a heavier stock. Run 61–A was performed at a low oil partial pressure of 2.9 p. s. i. a. Increase in coke temperatures at this pressure would produce a heavier gas oil product and little or no increase in gasoline yield since it would result mainly in decreased conversion required for the heavy hydrocarbons. When, however, the oil partial pressure was increased to 4.9 p. s. i. a. in run 58–B and the coke inlet temperature adjusted to give the same coke outlet temperature as in run 61–A, greatly increased conversion was obtained and the liquid product end point was lowered. The higher reactor bed temperatures in run 58–B reflect the higher boiliing point of the oil film under the pressure conditions prevailing.

It is obvious from the above that optimum results would be obtained with apparatus capable of still higher oil partial pressures. The test unit used for the above runs was not well suited to higher reactor pressures.

It will be apparent that my invention is of major importance with certain heavy liquid materials. As an example, a 3 to 4 A. P. I. gravity, 12 penetration asphalt containing 25% of carbon residue was converted in a once through operation into better than 25 volume percent of debutanized gasoline having an octane rating of 80 research clear and 91 research with 3 ccs. of tetraethyl lead. Such material is heavier than any material that has been charged to conventional coking processes, and even if operable, would yield inferior gasoline.

My improved method of cracking is not limited to such very heavy asphalts and pitches. Catalytic cycle stock is an example of another type of stock which is now being blended into black fuel oil because of its poor cracking characteristics. There are in the United States approximately 500,000 barrels per day of this material which can be converted into premium products by this method.

While I have shown and described a preferred form of embodiment of my invention, I am aware that modifications may be made that are within the scope and spirit of the disclosure herein and the claims appended hereinafter.

I claim:

1. The method for converting higher boiling hydrocarbons solely into lower boiling hydrocarbon vapors including a substantial proportion of high octane number motor fuel and solid residue in a sealed reaction space, in which a feed of higher boiling hydrocarbons in liquid phase and preheated to a temperature of about 650° to 850° F. is applied in the upper part of the reaction space to the surfaces of solid contact particles preheated to an inlet temperature of about 1000° to 1200° F. to wet said particles and produce rapid vaporization and cooling of the wetted particles to an effective surface temperature thereon approximately 150° to 200° F. less than said particle inlet temperature, and the resulting product vapors are passed rapidly downward through the void spaces between the wetted particles while said particles at substantially the same effective surface temperature move slowly downward through the reaction space as a gravity packed column so as to repress vaporization of liquid hydrocarbons wetting the particles, controlling the extent of the conversion of said liquid hydrocarbons on said particles by maintaining an oil partial pressure of about 5 to 50 pounds per square inch absolute in the reaction space, maintaining a superior reaction space pressure of the order of 30 to 115 pounds per square inch absolute, retaining the solid wetted particles in the reaction space for a time sufficient to produce substantially complete conversion of said liquid hydrocarbon feed to lower boiling hydrocarbon vapors and dry carbon deposit on said particles, removing said lower boiling hydrocarbon vapors from contact with the solid particles in the lower part of the reaction space before said particles have become dry, and separately withdrawing said particles bearing dry carbon deposit from the reaction space.

2. The method for converting higher boiling hydrocarbons solely into lower boiling hydrocarbon vapors including a substantial proportion of high octane number motor fuel and solid residue in a sealed reaction space, in which a feed of higher boiling hydrocarbons in liquid phase and preheated to a temperature of about 650° to 850° F. is applied in the upper part of the reaction space to the surfaces of solid coke particles preheated to an inlet temperature of about 1000° to 1200° F. to wet said particles and produce rapid vaporization and cooling of the wetted particles to an effective surface temperature thereon approximately 150° to 200° F. less than said particle inlet temperature, and the resulting product vapors are passed rapidly downward through the void spaces between the thus wetted particles while said particles at substantially the same effective surface temperature move slowly downward in the reaction space as a gravity packed column so as to repress vaporization of liquid hydrocarbons wetting the particles, controlling the extent of the conversion of said liquid hydrocarbons on said particles by maintaining an oil partial pressure of about 10 to 50 pounds per square inch absolute in the reaction space, maintaining a superior reaction space pressure of the order of 30 to 115 pounds per square inch absolute, retaining the solid wetted particles in the reaction space for a time sufficient to produce substantially complete conversion of said liquid hydrocarbon feed to lower boiling hydrocarbon vapors and dry carbon deposit on said particles, removing said lower boiling hydrocarbon vapors from contact with the solid particles in the lower part of the reaction space before said particles have become dry, and thereafter separately withdrawing said particles in dry condition from the reaction space.

References Cited in the file of this patent

UNITED STATES PATENTS

| | | |
|---|---|---|
| 2,429,545 | Bergstrom | Oct. 21, 1947 |
| 2,432,344 | Sinclair | Dec. 9, 1947 |
| 2,547,015 | Kirkbride | Apr. 3, 1951 |
| 2,556,514 | Bergstrom | June 12, 1951 |
| 2,574,503 | Simpson | Nov. 13, 1951 |